(12) United States Patent
Chhabra et al.

(10) Patent No.: US 11,641,335 B2
(45) Date of Patent: *May 2, 2023

(54) SINGLE MESSAGE MANAGEMENT PLATFORM

(71) Applicant: Micron Technology, Inc., Boise, ID (US)

(72) Inventors: Bhumika Chhabra, Boise, ID (US); Swetha Barkam, Meridian, ID (US); Kathryn H. Russo, Boise, ID (US); Zhao Zhao, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,870

(22) Filed: Sep. 8, 2022

(65) Prior Publication Data

US 2023/0006962 A1  Jan. 5, 2023

Related U.S. Application Data

(63) Continuation of application No. 17/391,494, filed on Aug. 2, 2021, now Pat. No. 11,456,986, which is a
(Continued)

(51) Int. Cl.
*H04L 51/42* (2022.01)
*H04W 4/14* (2009.01)
(Continued)

(52) U.S. Cl.
CPC ............. *H04L 51/42* (2022.05); *H04L 51/10* (2013.01); *H04L 51/214* (2022.05); *H04L 51/216* (2022.05); *H04W 4/14* (2013.01)

(58) Field of Classification Search
CPC ..... H04L 51/12; H04L 51/216; H04L 51/224; H04L 51/10; H04L 51/42; H04L 51/214;
(Continued)

(56) References Cited

U.S. PATENT DOCUMENTS

| | | |
|---|---|---|
| 8,090,787 B2 | 1/2012 | Polis et al. |
| 8,904,079 B2 | 12/2014 | Chang et al. |

(Continued)

FOREIGN PATENT DOCUMENTS

| | | |
|---|---|---|
| CN | 104303174 | 1/2015 |
| CN | 107636641 | 1/2018 |

(Continued)

OTHER PUBLICATIONS

First Office Action from related China Patent Application No. 202111286507.4, dated Jul. 18, 2022.

*Primary Examiner* — Sargon N Nano
(74) *Attorney, Agent, or Firm* — Brooks, Cameron & Huebsch, PLLC

(57) ABSTRACT

Methods and devices related to a single message management platform are described. In an example, a method can include receiving a first message at a first processing resource via a first application, receiving a second message at the first processing resource via a second application, receiving the first message and the second message at a memory, storing the first message and the second message in the memory, receiving a command to open a single message management platform, receiving the first message and the second message at the single message management platform, and organizing the first message and the second message at the single message management platform.

20 Claims, 3 Drawing Sheets

Related U.S. Application Data continuation of application No. 17/094,314, filed on Nov. 10, 2020, now Pat. No. 11,088,980.

(51) Int. Cl.
*H04L 51/216* (2022.01)
*H04L 51/10* (2022.01)
*H04L 51/214* (2022.01)

(58) Field of Classification Search
CPC . H04L 51/16; H04L 4/14; H04L 12/58; H04L 51/22; H04L 51/14
See application file for complete search history.

(56) References Cited

U.S. PATENT DOCUMENTS

| | | | | |
|---|---|---|---|---|
| 9,576,270 | B1* | 2/2017 | Afshar | H04L 51/214 |
| 10,594,641 | B2* | 3/2020 | Beausoleil | H04L 51/234 |
| 10,742,745 | B2* | 8/2020 | Griffin | H04L 67/14 |
| 10,938,796 | B2* | 3/2021 | Rathbone | H04L 63/062 |
| 10,963,529 | B1* | 3/2021 | Amitay | G06F 3/0488 |
| 2002/0170002 | A1 | 11/2002 | Steinberg et al. | |
| 2004/0088359 | A1 | 5/2004 | Simpson | |
| 2005/0204001 | A1 | 9/2005 | Stein et al. | |
| 2009/0319456 | A1 | 12/2009 | Consul et al. | |
| 2011/0125793 | A1* | 5/2011 | Erhart | G06Q 50/01 707/E17.014 |
| 2011/0213670 | A1 | 9/2011 | Strutton et al. | |
| 2012/0260209 | A1* | 10/2012 | Stibel | G06Q 40/02 715/780 |
| 2013/0097526 | A1 | 4/2013 | Stovicek et al. | |
| 2015/0066788 | A1* | 3/2015 | Tebbe | G06Q 50/01 705/319 |
| 2016/0344667 | A1 | 11/2016 | Lane et al. | |
| 2017/0201484 | A1* | 7/2017 | Afshar | H04L 51/52 |
| 2017/0262873 | A1* | 9/2017 | Atchley | G06Q 50/01 |
| 2017/0337274 | A1 | 11/2017 | Ly et al. | |
| 2018/0253659 | A1 | 9/2018 | Lee et al. | |
| 2019/0020606 | A1 | 1/2019 | Vasudeva et al. | |
| 2019/0325778 | A1* | 10/2019 | Singh | G09B 19/00 |
| 2019/0342234 | A1 | 11/2019 | Belling et al. | |

FOREIGN PATENT DOCUMENTS

| | | |
|---|---|---|
| CN | 110892684 | 3/2020 |
| CN | 111464694 | 7/2020 |
| EP | 3186775 A1 | 7/2017 |

* cited by examiner

SINGLE MESSAGE MANAGEMENT PLATFORM

PRIORITY INFORMATION

This application is a Continuation of U.S. application Ser. No. 17/391,494, filed Aug. 2, 2021, which is a Continuation of U.S. application Ser. No. 17/094,314, filed on Nov. 10, 2020, which issued as U.S. Pat. No. 11,088,980 on Aug. 10, 2021, the contents of which are incorporated herein by reference.

TECHNICAL FIELD

The present disclosure relates generally to a single message management platform.

BACKGROUND

A computing device can be a smartphone, a wearable device, a tablet, a laptop, a desktop computer, or a smart assistant device, for example. The computing device can receive and/or transmit messages via cables, cellular networks, Wi-Fi, or other channels. A computing device can receive a number of messages from other computing devices using a number of different applications on the computing device. A user of the computing device can send or receive a particular type of message by opening an application on the computing device that uses the particular type of message.

The computing device can include or be coupled to one or more memory devices. Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random-access memory (DRAM), static random-access memory (SRAM), synchronous dynamic random-access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random-access memory (RRAM), and magnetoresistive random access memory (MRAM), such as spin torque transfer random access memory (STT RAM), among others.

DETAILED DESCRIPTION

Figure 1:
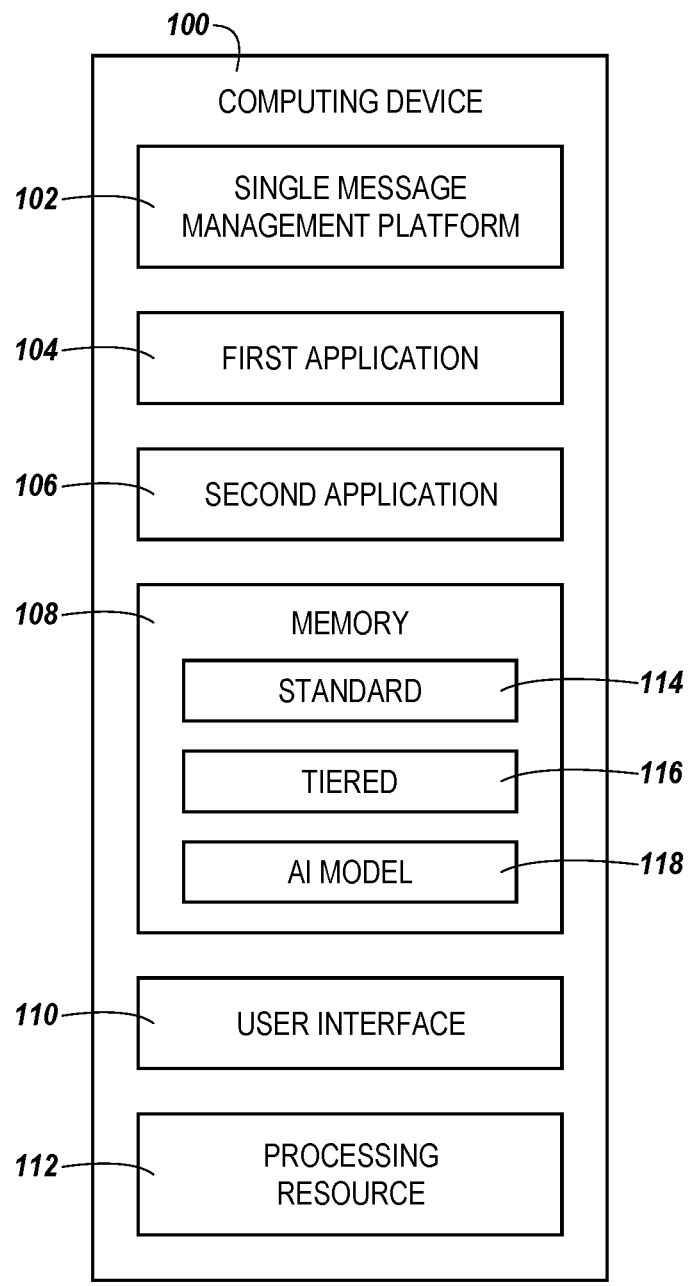
FIG. 1 illustrates an example of an apparatus including a single message management platform in accordance with a number of embodiments of the present disclosure.

The present disclosure includes methods and apparatuses related to receiving a first message at a first processing resource via a first application, receiving a second message at the first processing resource via a second application, receiving the first message and the second message at a memory, storing the first message and the second message in the memory, receiving a command to open a single message management platform, receiving the first message and the second message at the single message management platform, and organizing the first message and the second message at the single message management platform.

The single message management platform can be included on an operating system of a computing device and/or included on an application downloaded onto the computing device. The single message management platform can receive messages from memory on the computing device and/or cloud memory. The messages can be different types of messages. For example, the messages can be text messages, email messages, WhatsApp messages, Instagram direct messages, Facebook messages, and/or Google Chat messages.

A user can receive and/or transmit the different types of messages using the single message management platform. For example, the user can receive an email from a contact and send a response email to the contact via the single message management platform instead of opening an email application or going to an email website.

In a number of embodiments, the single message management platform can organize messages by ordering, color coding, and/or filtering messages. For example, the messages can be ordered, color coded, and/or filtered by priority, contact, date, and/or content. The single message management platform can also perform other functions, for instance, converting text of a message to language and audibly conveying the message via a speaker, translating text, sending reminder notifications to a user to respond to a message, holding messages for administrative approval, determining content of a message, requesting a user to specify where a message should be stored, and/or determining where a message should be stored.

The single message management platform can perform operations at least partially based on user commands and/or user settings. A user can enter and/or select user commands and/or user settings (e.g., user preferences) using the single message management platform.

As used herein, "a number of" something can refer to one or more of such things. For example, a number of messages can refer to one or more messages. A "plurality" of something intends two or more. Additionally, designators such as "X" and "Y", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 102 may reference element "2" in FIG. 1, and a similar element may be referenced as 202 in FIG. 2. In some instances, a plurality of similar, but functionally and/or structurally distinguishable, elements or components in the same figure or in different figures may be referenced sequentially with the same element number (e.g., 222-1, 222-2, and 222-X in FIG.

2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example of a computing device 100 including a single message management platform 102 in accordance with a number of embodiments of the present disclosure. The computing device 100 can be, but is not limited to, a smartphone, a wearable device, a tablet, a laptop, a desktop computer, a smart assistant device, or any combination thereof. The computing device 100 can receive and/or transmit messages via cables, cellular networks, Wi-Fi, or other channels.

A single message management platform 102, a first application 104, and/or a second application 106 can be included on an operating system of the computing device 100 and/or can be downloaded onto the computing device 100. A memory 108, a user interface 110, and/or a processing resource 112 can be included in and/or coupled to the computing device 100.

The memory 108 can include standard memory 114 (e.g., NAND) and/or tiered memory 116 (e.g., DRAM) and can store an artificial intelligence (AI) model 118. The memory 108 can be any type of storage medium that can be accessed by the processing resource 112 to perform various examples of the present disclosure. For example, the memory 108 can be a non-transitory computer readable medium having computer readable instructions (e.g., computer program instructions) stored thereon that are executable by the processing resource 112 to receive signaling including data representing a message via an application from a radio and/or a different intermediary device in communication with a different processing resource of a different computing device, organize the data representing the message at the single message management platform 102, receive signaling including the organized data representing the message at the user interface 110 from the single message management platform 102, and display the organized data representing the message on the user interface 110. As used herein, signaling can include a communication (e.g., a radio signal) that carries data from one location to another. In some examples, the computing device 100 can include communication devices (e.g., intermediary devices), such as, but not limited to, radios.

The processing resource 112 can include components configured to enable the computing device 100 to perform AI operations. In some examples, AI operations may include training operations or interference operations, or both. In a number of embodiments, the AI model 118 can be trained remotely in a cloud using sample data and transmitted to the computing device 100.

In a number of embodiments, data representing one or more messages can be stored in memory 108 and/or inputted into the AI model 118. The data representing the one or more messages can include text, links, pictures, and/or videos.

In some examples, user settings can be stored in memory 108 and/or inputted into the AI model 118. The user settings can include a contact list, a ranking of contacts, a language setting, and/or a reminder setting, for example. Each contact can include a contact's phone number, email address, username, ranking, profession, relationship to the user, and/or language.

In a number of embodiments, user settings can be inputted via user interface 110. The user interface 110 can be generated by computing device 100 in response to one or more commands. The user interface 110 can be a graphical user interface (GUI) that can provide and/or receive information to and/or from the user of the computing device 100. In a number of embodiments, the user interface 110 can be shown on a display of the computing device 100.

Figure 2:
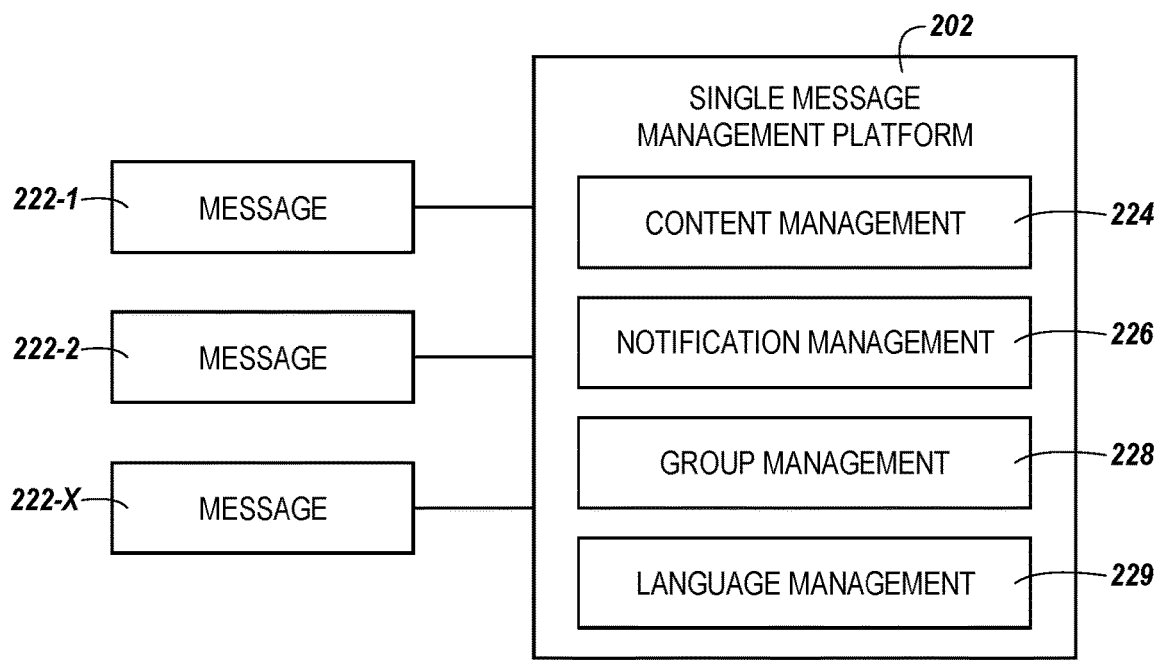
FIG. 2 illustrates an example of a single message management platform receiving a number of messages in accordance with a number of embodiments of the present disclosure.

FIG. 2 illustrates an example of a single message management platform 202 receiving a number of messages 222-1, 222-2, . . . , 222-X in accordance with a number of embodiments of the present disclosure. The single message management platform 202 can perform a number of operations including content management 224, notification management 226, group management 228, and/or language management 229.

The number of operations can be based on user commands and/or user settings. The user commands and/or user settings can be entered and/or selected via a user interface (e.g., user interface 110 in FIG. 1). In some examples, the single message management platform can determine and set user settings by performing AI operations using an AI model (e.g., AI model 118 in FIG. 1). For example, the single message management platform can input a user's previous commands and determine and set user settings at least partially based on the output of the AI model. An AI operation to determine and update user settings can be periodic and/or in response to a user entering a command.

Content management 224 can include the single message management platform 202 organizing the content of the number of messages 222-1, 222-2, . . . , 222-X. In a number of embodiments, the single message management platform 202 can determine an order that the messages 222-1, 222-2, . . . , 222-X should be placed in and display the messages in the determined order. For example, the single message management platform 202 can display the messages 222-1, 222-2, . . . , 222-X in the determined order by arranging the messages vertically in the determined order, arranging the messages horizontally in the determined order, only displaying the first message in the determined order, and/or distinguishing the first message in the determined order. The first message in the determined order can be distinguished from the other messages in the determined order by, for example, size, color, shade, and/or font.

The single message management platform 202 can determine the order of the messages 222-1, 222-2, . . . , 222-X based on user commands and/or user settings. The number of messages 222-1, 222-2, . . . , 222-X can be ordered by, for example, priority, contact, date, and/or content.

The priority of each of the number of messages 222-1, 222-2, . . . , 222-X can be determined based on user commands and/or user settings. The user can set the priority of a message based on the contact, the date, and/or the content of the message, for example. In a number of embodiments, the user can rank their contacts in order of priority. For example, the user can rank a first contact as a higher priority than a second contact. Accordingly, the single message management platform 202 can display an unread message from the first contact ahead of an unread message from the second contact in order of priority regardless of whether the second unread message was received before or after the first unread message.

In some examples, a user can set the priority of each of the number of messages 222-1, 222-2, . . . , 222-X based on the date and/or the time the message was received. For example, the user can prioritize older unread messages over newer unread messages. Accordingly, the single message management platform 202 can display the older unread messages ahead of the newer unread messages.

The single message management platform 202 can determine the content of each message of the number of messages 222-1, 222-2, ..., 222-X and determine the priority of each of the number of messages 222-1, 222-2, ..., 222-X based on the content. The content can include text, a link, a picture, and/or a video for example. In some examples, the user can prioritize video over text and the single message management platform 202 can display a message including a video ahead of a message including text.

Each content category can have a unique portion of metadata and/or require a different amount of memory. The single message management platform 202 can determine the content of a message based on a portion of the metadata of the message and/or the size of the message. For example, a message including a video can be larger than a message including text.

In a number of embodiments, the single message management platform 202 can color code the number of messages 222-1, 222-2, ..., 222-X based on user commands and/or user settings. The number of messages 222-1, 222-2, ..., 222-X can be color coded by priority, contact, date, and/or content. For example, the highest priority message can be displayed in red and/or the lowest priority message can be displayed in green. In a number of embodiments, each contact can have its own color, and messages received from a particular contact can be displayed in a particular color. In some examples, the single message management platform 202 can display a calendar for the user to select a particular date from. All messages received on that date can be displayed in a particular color to indicate that the messages were received on that date. In a number of embodiments, the number of messages 222-1, 222-2, ..., 222-X can be displayed in a color based on their content. For example, messages including pictures can be displayed in blue and messages including videos can be displayed in purple.

A user can filter the number of messages 222-1, 222-2, ..., 222-X based on user commands and/or user settings. For example, the user can select to filter the number of messages 222-1, 222-2, ..., 222-X by priority, contact, date, and/or content. In some examples, the user can filter the number of messages 222-1, 222-2, ..., 222-X by entering a word or phrase into a search box displayed by the single message management platform 202. Filtering may display only messages that are included in that filter. For example, if the user selects video content, only messages including video may be displayed on the single message management platform 202. If the user searches the word "party", only messages including the word "party" may be displayed. In some examples, the single message management platform 202 can display a calendar for the user to select a particular date from. In response to a user selecting a date, only messages received on that date may be displayed.

Notification management 226 can include the single message management platform 202 generating notifications and/or reminders based on user commands and/or user settings. A notification and/or a reminder can be executed as a message, a light, a vibration, and/or a sound, for example.

The single message management platform 202 can generate a notification to inform a user that they have received a message. In some examples, a notification may be generated and executed in response to receiving a message based on priority, contact, date, and/or content of the message. For example, the user may receive a message that has a higher priority and a message that has a lower priority and the single message management platform 202 may only generate and execute a notification for the message that has the higher priority.

The single message management platform 202 can generate a notification to request a user to specify where a message should be stored. For example, the single message management platform 202 can provide a number of storage options the user can select from including a number of folders and/or a number of memory types. The single message management platform 202 can receive a selection from the user and store the message in the selected folder and/or the selected memory type in response to the user's selection.

In a number of embodiments, the user can generate and execute a reminder. The single message management platform 202 can generate a reminder to inform a user that they have not responded to a message or a question posed in a message. For example, the single message management platform 202 can generate data representing a reminder including data representing the message that the user has not responded to after a particular period of time has passed since receiving the message. The period of time can be a default period of time or can be set in the user settings.

In some examples, a reminder may be generated and executed in response to receiving a message based on priority, contact, date, and/or content of the message. For example, the user may have an unread message from a first contact and an unread message from a second contact and the single message management platform 202 may only generate and execute a reminder for the unread message from the second contact.

Group management 228 can include the single message management platform 202 managing group messaging based on user commands and/or user settings. Group messaging can be messages that include two or more contacts. The single message management platform 202 can manage group messaging by providing a unique identifier for each contact, providing a voting process, and/or providing an administrative approval process.

The single message management platform 202 can assign each contact a unique identifier and display the unique identifier on each message received from that contact. For example, messages from a first contact can be displayed in yellow and messages from a second contact can be displayed in orange to assist the user in identifying who a message is from.

In a number of embodiments, the single message management platform 202 can generate a voting process in response to a command from a user or in response to a user including a question in a message. In some examples, the voting process can include providing a question and/or a number of options to a number of recipients, receiving votes from the number of recipients, sending reminders to recipients who haven't voted after a period of time, tolling the votes, and/or transmitting a message with the voting results to the number of recipients. The voting results can be transmitted after a certain period of time and/or in response to receiving a command to end voting.

In some examples, the single message management platform 202 can allow an administrator to receive and approve or deny a message prior to the message being sent to contacts in a group message. An administrator can be a user that created the group message and/or can be assigned as the administrator by a group vote.

Language management 229 can include converting text of a message to language, translating between languages, and/or audibly conveying a message. Language management can be based on user commands and/or user settings. For example, text of a message can be converted to language and audibly conveyed via a speaker of a computing device (e.g., computing device 100) in response to a user selecting a command to audibly convey the message. In some examples, a user can receive a message in a first language and the single message management platform 202 can translate and display the message to the user in a second language based on user settings. In a number of embodiments, a user can transmit a message to a particular contact in a first language and the single message management platform can translate the message to a second language based on user preferences for that particular contact.

Figure 3:
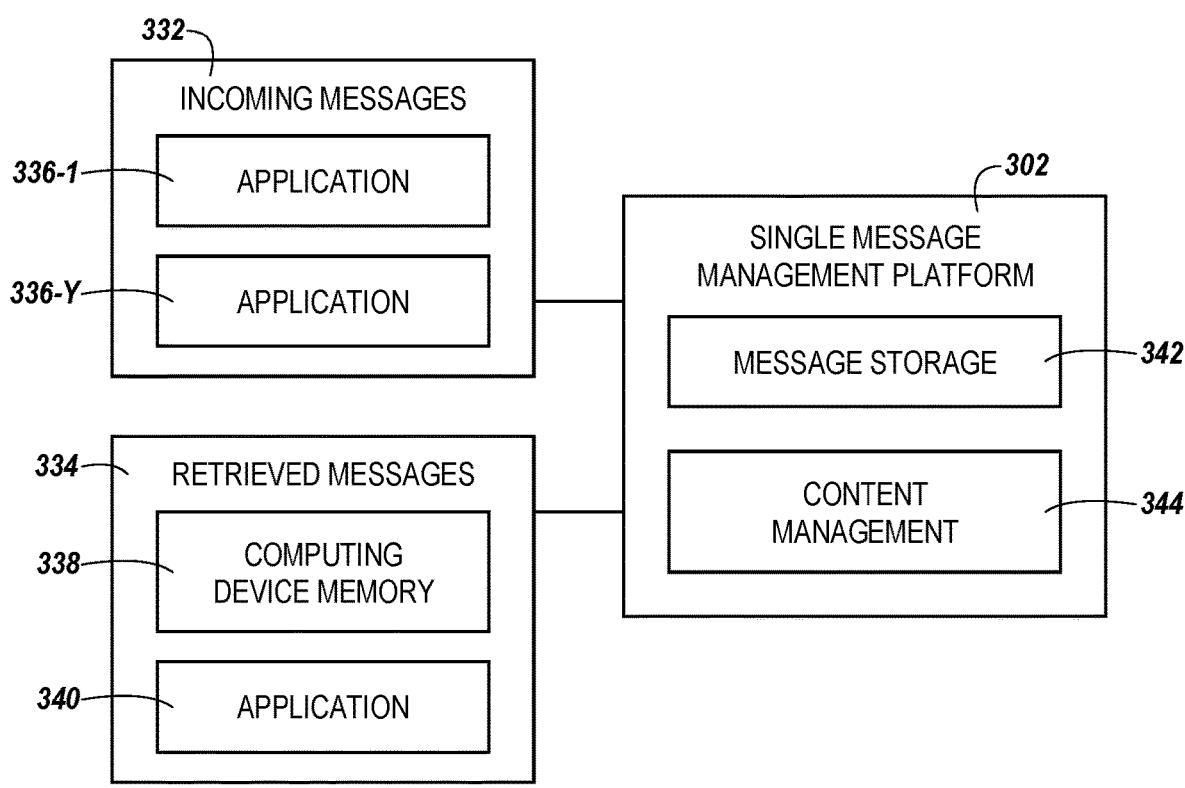
FIG. 3 illustrates an example of a single message management platform receiving incoming messages and retrieved messages in accordance with a number of embodiments of the present disclosure.

FIG. 3 illustrates an example of a single message management platform 302 receiving incoming messages 332 and retrieved messages 334 in accordance with a number of embodiments of the present disclosure. The incoming messages 332 can include messages received at a number of applications 336-1, . . . , 336-Y. The incoming messages 332 can be received with or without the number of applications 336-1, . . . , 336-Y being installed on the computing device (e.g., computing device 100 in FIG. 1). For example, the incoming messages 332 can be received at the single message management platform 302 in response to providing a username and password for each of the number of applications 336-1, . . . , 366-Y to the single message management platform 302.

The retrieved messages 334 can include messages stored in computing device memory 338 and/or cloud memory 340. The computing device memory 338 can be included on and/or coupled to the computing device and the cloud memory can be back up memory wirelessly coupled to the computing device, for example. In a number of embodiments, the computing device memory 338 can correspond to memory 108 in FIG. 1.

The single message management platform 302 can receive the incoming messages 332 and/or the retrieved messages 334 periodically, in response to a command from a user, in response to an application of the number of applications 336-1, . . . , 336-Y receiving a message, and/or in response to the computing device memory 338 and/or the cloud memory 340 storing a message.

Once a message is received, the single message management platform 302 can determine message storage 342 and/or perform content management 344, as described in connection with FIG. 2, for that message based on user commands and/or user settings. The single message management platform 302 can determine what type of memory to store the message in and what folder in that type of memory to store the message in based on user settings, priority, contact, date, and/or content. The types of memory can include tiered memory (e.g., tiered memory 116 in FIG. 1) for content that requires more memory and processing load and standard memory (e.g., standard memory 114 in FIG. 1) for content that requires less memory and processing load. For example, the single message management platform 302 may determine a first message includes a video and a second message includes text. In response to determining the first message includes video, the single message management platform 302 may store the first message in tiered memory and in response to determining the second message includes text, the single message management platform 302 may store the second message in standard memory. In some examples, the first message including the video can be stored in a video folder in the tiered memory and the second message including the text can be stored in a text folder in the standard memory.

Figure 4:
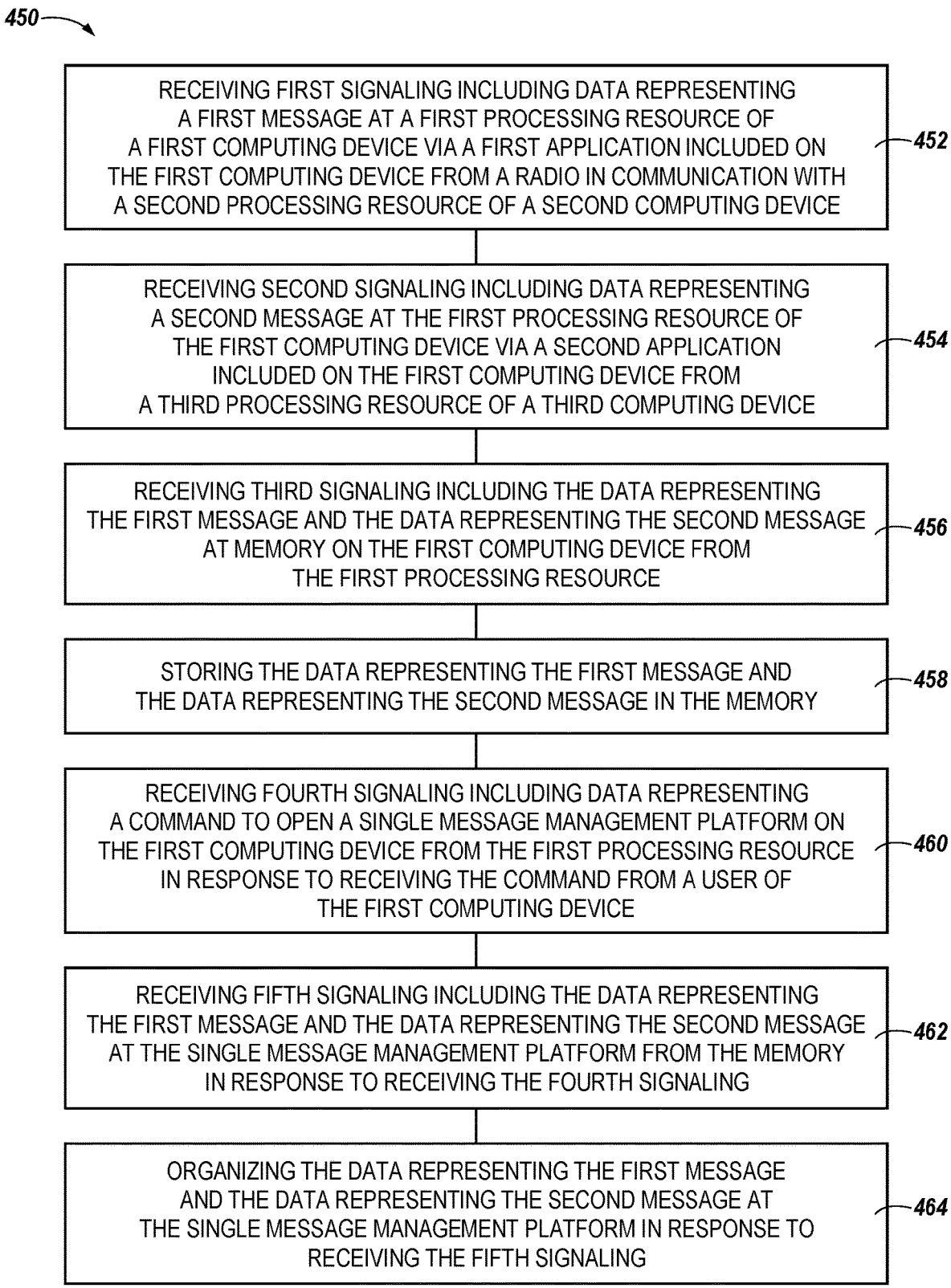
FIG. 4 is a flow diagram of a method associated with a single message management platform in accordance with a number of embodiments of the present disclosure.

FIG. 4 is a flow diagram of a method 450 associated with a single message management platform in accordance with a number of embodiments of the present disclosure. At block 452, the method 450 can include receiving first signaling including data representing a first message at a first processing resource of a first computing device via a first application included on the first computing device from a radio in communication with a second processing resource of a second computing device. For instance, the first signaling can include data representing a text message including a video.

At block 454, the method 450 can include receiving second signaling including data representing a second message at the first processing resource of the first computing device via a second application included on the first computing device from a third processing resource of a third computing device. For instance, the second signaling can include data representing an email message including a web site link.

At block 456, the method 450 can include receiving third signaling including the data representing the first message and the data representing the second message at memory on the first computing device from the first processing resource. For example, the text message including the video and the email message including the website link can be received at the memory on the first computing device.

At block 458, the method 450 can include storing the data representing the first message and the data representing the second message in the memory. The text message including the video and the email message including the website link can be stored in the memory on the first computing device.

At block 460, the method 450 can include receiving fourth signaling including data representing a command to open a single message management platform on the first computing device from the first processing resource in response to receiving the command from a user of the first computing device. In some examples, the single message management platform can be updated and/or displayed in response to the user selecting an icon representing the single message management platform on the user interface and/or conveying a verbal command to the first computing device.

At block 462, the method 450 can include receiving fifth signaling including the data representing the first message and the data representing the second message at the single message management platform from the memory in response to receiving the fourth signaling. The single message management platform can receive the text message including the video, the email message including the website link, and/or other messages from the memory to update the number of messages on the single message management platform. In some examples, the single message management platform can be updated in response to the user selecting an icon representing the single message management platform on the user interface and/or conveying a verbal command to the first computing device.

At block 464, the method 450 can include organizing the data representing the first message and the data representing the second message at the single message management platform in response to receiving the fifth signaling. In some examples, organizing the data representing the first message and the data representing the second message can include organizing the data representing the first message and the data representing the second message in an order of priority. The method 450 can include determining the order of priority of the first message and the second message based at least partially on the data representing the first message and the data representing the second message. For example, the user can prioritize video over a text link and accordingly, the single message management platform can prioritize the text message with the video ahead of the email with the internet link. In some examples, the order of priority can at least be partially based on a ranking of contacts in order of priority. For example, the email message from a parent can be prioritized over the text message from a friend in response to the parent having a higher ranking than the friend.

In a number of embodiments, the method 450 can further include a user interface of the first computing device receiving signaling including the organized data representing the first message and the organized data representing the second message from the single message management platform. The user interface can display the organized data representing the first message and the organized data representing the second message simultaneously via the single message management platform in response to receiving the signaling including the organized data representing the first message and the organized data representing the second message. For example, the organized data representing the first message and the organized data representing the second message can be displayed in the determined order of priority on the user interface.

In some examples, the first message and/or the second message can be converted from text to speech and conveyed to a user via a speaker. The text can be converted to speech and/or the speech can be conveyed to the user in response to the user settings. The user settings can also dictate which language the text is converted to and/or conveyed in.

The method 450 can further include generating data representing a third message including the data representing the first message at the single message management platform after a particular period of time has passed since receiving the first signaling at the first processing resource and receiving signaling including the data representing the third message at the user interface from the single message management platform in response to the single message management platform generating the data representing the third message. For example, the single message management platform can generate data representing a reminder including data representing the message that the user has not responded to after a particular period of time has passed since receiving the message. The period of time can be a default period of time or can be set in the user settings.

The memory can include a number of folders. In some examples, the method 450 can further include determining the data representing the first message should be stored in a particular folder in the memory based at least partially on the data representing the first message and user settings at the single message management platform, receiving signaling including the data representing the first message at the particular folder in the memory from the single message management platform in response to determining the data representing the message should be stored in the particular folder, and storing the first message in the particular folder in the memory in response to receiving the sixth signaling. For example, the text message including the video can be stored in a video folder in the tiered memory and the email message including the website link can be stored in a link folder in the standard memory.

In a number of embodiments, the method 450 can further include receiving signaling including data representing a command to send the data representing the first message and sending the data representing the first message to a group of contacts in response to receiving the signaling including the data representing the command. In some examples, the single message management platform can allow an administrator to receive and approve or deny a message prior to the message being sent to contacts in a group message. For example, the user can be an administrator and receive the text message including the video and approve the message to be sent to a group of contacts by selecting an icon on the user interface.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving first signaling including data representing a first message at a smartphone from a different smartphone;
receiving second signaling including data representing a second message at the smartphone from a wearable device;
receiving third signaling including the data representing the first message and the data representing the second message at memory on the smartphone;
storing the data representing the first message and the data representing the second message in the memory;
receiving fourth signaling including the data representing the first message and the data representing the second message at a single message management platform from the memory; and
organizing the data representing the first message and the data representing the second message at the single message management platform in response to receiving the fourth signaling.

2. The method of claim 1, comprising generating data representing a notification at the single message management platform to inform a user that at least one of the first message or the second message was received in response to receiving the fourth signaling.

3. The method of claim 2, comprising transmitting fifth signaling including the data representing the notification from the single message management platform in response to generating the data representing the notification.

4. The method of claim 3, comprising:
receiving the fifth signaling including the data representing the notification at a user interface of the smartphone from the single message management platform; and
displaying the data representing the notification on the user interface in response to receiving the fifth signaling.

5. The method of claim 1, comprising:
generating data representing a command at the single message management platform in response to receiving the fourth signaling; and
transmitting fifth signaling including the data representing the command from the single message management platform in response to generating the data representing the command.

6. The method of claim 5, comprising generating at least one of a light, a vibration, or a sound at the smartphone in response to receiving the fifth signaling.

7. The method of claim 1, comprising:
receiving fifth signaling including the organized data representing the first message and the organized data representing the second message at a user interface of the smartphone from the single message management platform; and
displaying the organized data representing the first message and the organized data representing the second message simultaneously via the single message management platform on the user interface of the smartphone in response to receiving the fifth signaling.

8. The method of claim 1, comprising:
determining an order of priority of the first message and the second message at the single message management platform based at least partially on the data representing the first message and the data representing the second message;
organizing the data representing the first message and the data representing the second message in the determined order of priority at the single message management platform;
receiving fifth signaling including the organized data representing the first message and the organized data representing the second message in the determined order of priority at a user interface from the single message management platform of the smartphone; and
displaying the organized data representing the first message and the organized data representing the second message in the determined order of priority on the user interface of the smartphone.

9. The method of claim 8, comprising determining the order of priority at least partially based on a ranking of contacts in order of priority, wherein the first message from a first contact is prioritized over the second message from a second contact in response to the first contact having a higher ranking than the second contact.

10. The method of claim 1, comprising:
converting the first message from text to speech at the single message management platform at least partially based on user settings; and
conveying the speech via a speaker of the smartphone.

11. The method of claim 10, converting the first message from text to speech in a particular language, wherein the particular language is selected based at least partially based on the user settings.

12. An apparatus, comprising:
a single message management platform;
a memory;
a user interface; and
a processing resource configured to execute instructions stored in the memory to:
receive first signaling including data representing a first message from a tablet;
receive second signaling including data representing a second message from a laptop;
receive third signaling including the data representing the first message and the data representing the second message at the memory;
store the data representing the first message and the data representing the second message in the memory;
receive fourth signaling including data representing a command to open the single message management platform in response to receiving the command from a user;
receive fifth signaling including the data representing the first message and the data representing the second message at the single message management platform from the memory in response to receiving the fourth signaling;
organize the data representing the first message and the data representing the second message at the single message management platform in response to receiving the fifth signaling;
receive sixth signaling including the organized data representing the first message and the organized data representing the second message at the user interface from the single message management platform; and
display the organized data representing the first message and the organized data representing the second message simultaneously via the single message management platform on the user interface in response to receiving the sixth signaling.

13. The apparatus of claim 12, wherein the processing resource is configured to execute instructions stored in the memory to assign a first identifier to a first contact associated with the first message and assign a second identifier to a second contact associated with the second message at the single message management platform in response to receiving the fifth signaling.

14. The apparatus of claim 13, wherein the first identifier is displayed with the first message and the second identifier is displayed with the second message on the user interface.

15. The apparatus of claim 14, wherein the first identifier is a first color and the second identifier is a second color.

16. The apparatus of claim 15, wherein the processing resource is configured to execute instructions stored in the memory to transmit seventh signaling including data representing at least one of a question or a number of options to the first contact and the second contact.

17. The apparatus of claim 12, wherein the first message is a text message, email message, WhatsApp message, WeChat message, Instagram direct message, Facebook message, or a Google Chat message.

18. An apparatus, comprising:
a single message management platform;
a standard memory;
a tiered memory; and
a processing resource configured to:
receive first signaling including data representing a first message from a desktop computer;
receive second signaling including data representing a second message from a smart assistant device;

receive third signaling including the data representing the first message and the data representing the second message at a single message management platform; and organize the data representing the first message and the data representing the second message at the single message management platform in response to receiving the third signaling.

19. The apparatus of claim 18, wherein the processing resource is configured to determine content of the data representing the first message and the content of the data representing the second message at the single message management platform.

20. The apparatus of claim 19, wherein the processing resource is configured to:

receive fourth signaling including the data representing the first message at the standard memory from the single message management platform at least partially based on the determined content of the data representing the first message; and receive fifth signaling including the data representing the second message at the tiered memory from the single message management platform at least partially based on the determined content of the data representing the second message.

* * * * *